March 25, 1947.  A. SIMMON  2,418,108
CAMERA VIEW AND RANGE FINDER
Filed Dec. 28, 1945  7 Sheets-Sheet 1
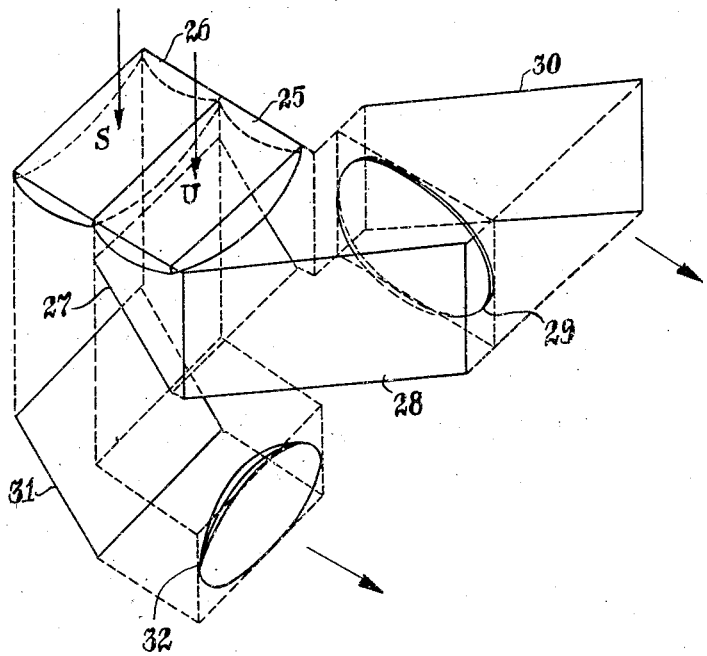
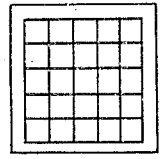
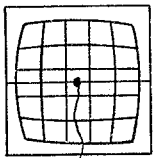
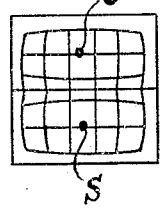
INVENTOR.
Alfred Simmon
BY
Walter E. Wallheim

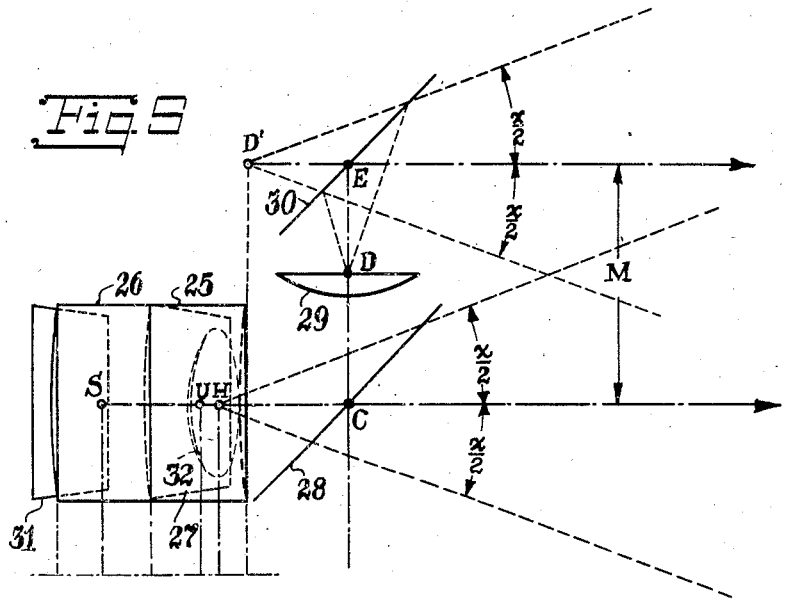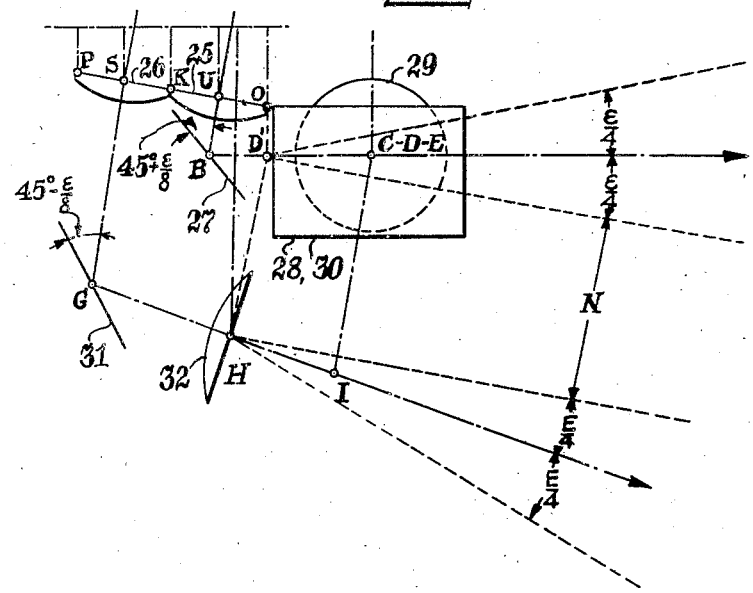

March 25, 1947. A. SIMMON 2,418,108
CAMERA VIEW AND RANGE FINDER
Filed Dec. 28, 1945 7 Sheets-Sheet 3

INVENTOR.
Alfred Simmon
BY
Walter E. Wallheim

March 25, 1947.  A. SIMMON  2,418,108
CAMERA VIEW AND RANGE FINDER
Filed Dec. 28, 1945  7 Sheets-Sheet 5

INVENTOR.
Alfred Simmon
BY
Walter E. Woelbern

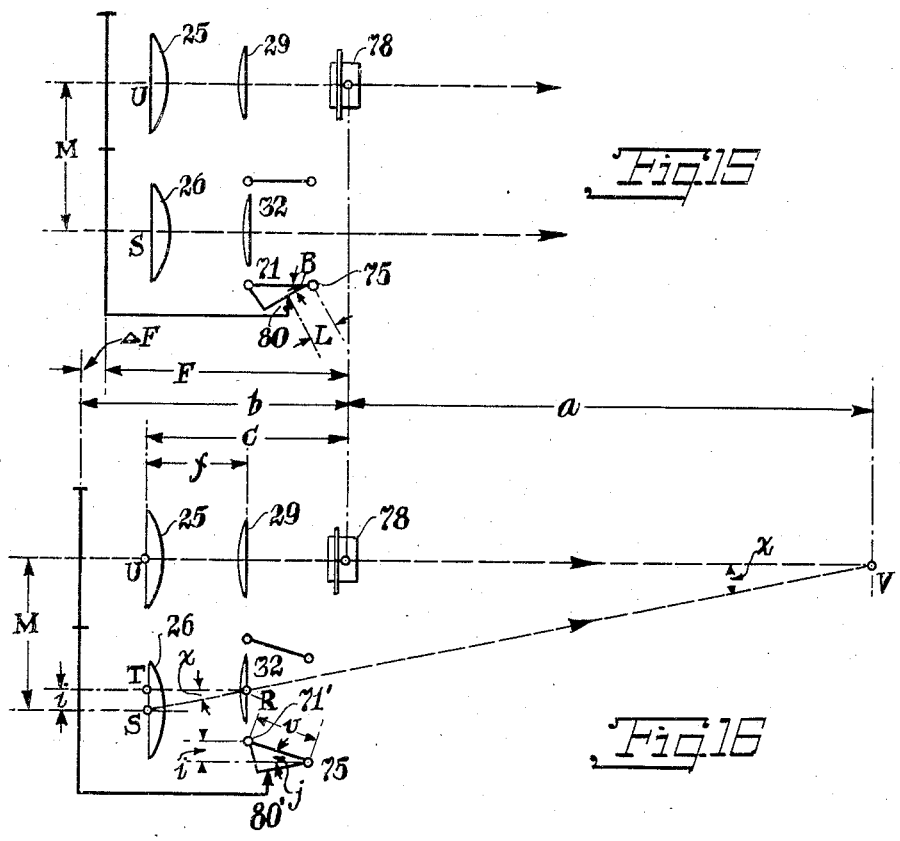
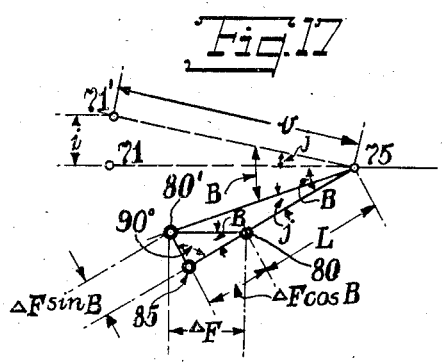

March 25, 1947.   A. SIMMON   2,418,108
CAMERA VIEW AND RANGE FINDER
Filed Dec. 28, 1945   7 Sheets-Sheet 7

INVENTOR.
Alfred Simmon
BY Walter E. Wallheim

Patented Mar. 25, 1947

2,418,108

UNITED STATES PATENT OFFICE 2,418,108

CAMERA VIEW AND RANGE FINDER

Alfred Simmon, Jackson Heights, N. Y., assignor to Simmon Brothers, Inc., Long Island City, N. Y., a corporation of New York Application December 28, 1945, Serial No. 637,600

23 Claims. (Cl. 95—44)

This invention pertains to a camera view and range finder of the so called "brilliant" type.

A view finder of the so called "brilliant" type consists of a large, usually square or rectangular, field lens arranged in a substantially horizontal plane, a 45° mirror underneath this field lens and an image forming lens in front of this mirror, this arrangement adapted to be viewed with both eyes from a convenient reading distance, i. e., approximately 10". The image forming lens projects an image of the object to be photographed into the plane of a field lens, and the focal length of this image forming lens should preferably be such that it covers approximately the same field as a camera lens.

The forwardly inclined 45° mirror not only changes the direction of the light beam but acts as an image erecting element so that the observer sees an upright, although still laterally inverted, image.

The field lens projects an enlarged image of the image forming lens into a plane containing the eyes of the observer. This image may be either real or virtual. As long as both eyes of the observer stay within the area covered by this image they will see the view presented by the finder simultaneously and it is, of course, desirable to make this area larger than strictly necessary so that the observer may move his head slightly in any direction and still be able to see the view finder image with both eyes. View finders which must be held closely to one eye of the observer and which comprise telescopes of some kind are specifically excluded by this definition of a "brilliant" view finder. The "brilliant" finder thus described is in many respects the most satisfactory camera finder yet devised.

Any view finder can be converted into a range finder by splitting its image and by introducing a certain amount of parallaxis between the two part images. For objects closer than infinity the two part images will then be out of register but, by adjusting at least one of the optical elements in at least one of the part image systems, coincidence can be restored, and the amount of adjustment necessary for this purpose is a measure of the distance of the object from the camera. Preferably this adjustment is connected with the focusing movement of the camera lens so that a given object is focused sharply on the film whenever the two parts of its split image in the range finder field are in register.

The range and view finder disclosed in the following specifications and embodying the principles of my invention has the following chief characteristics:

1. The general layout is very simple, and only a very small number of optical elements, i. e., four lenses and four reflectors, are being used.

2. Barrel shaped distortion with which finders of this type are generally afflicted is reduced by aligning all lenses on center lines which pass through the two respective centers of the two part images rather than through the center of the whole image.

3. Lenses and reflectors have been so disposed that both light beams for the two respective part images are of equal length.

4. One of the light beams emerging from the finder is inclined slightly upwardly and the other light beam is inclined slightly downwardly. In this manner both part images cover adjacent and supplementary portions of the finder image when the finder is adjusted for infinity.

5. A certain amount of perspective distortion is introduced into the system by this upward and downward inclination of the two light beams. Simple means are employed to eliminate this perspective distortion.

6. Very simple mechanical means are employed to deviate one of the beams for range finding purposes, i. e., restore the registry of the two part images lost by the introduction of parallaxis as described above.

7. While one of the beams is deviated in one direction for range finding purposes the other beam is deviated in a direction perpendicular to said first direction in order to make both part images cover supplementing portions of the finder image at all distances. This is important since the two light beams have not only a horizontal displacement or parallaxis which is being utilized for range finding purposes but also an unavoidable amount of vertical displacement which, without this added device, would make the coverage of supplementing portions of the image at all distances impossible.

8. Simple means are provided to eliminate parallaxis between the camera lens and the two optical systems of the range finder, respectively.

Similar principles have been expounded in a copending application Serial #533,271, filed by me on April 29, 1944.

The invention is illustrated by means of the accompanying drawings in which:

Fig. 1 shows the general arrangement of the optical system in axonometric projection;

Figs. 2, 3 and 4 serve to illustrate one of the chief difficulties with which finders of this type are generally afflicted, i. e., barrel shaped distortion;

Figs. 5 and 6 show the optical system in actual proportions and explain the essential dimensions of the device;

Figs. 7 and 8 serve to illustrate a perspective distortion with which the device is afflicted;

Fig. 9 is substantially identical with Fig. 6, but includes means to eliminate perspective distortion;

Figs. 10 and 11 are similar to Figs. 5 and 6 but show the finder as adjusted for a closeup whereas in Figs. 5 and 6 the infinity position is shown;

Figs. 15, 16 and 17 are diagrams by means of which the dimensions of the beam deviating device used for range finding purposes will be derived;

Figure 18:
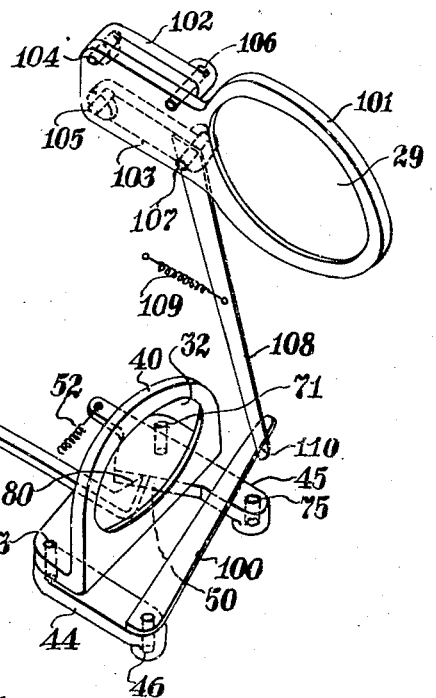
Figure 19:
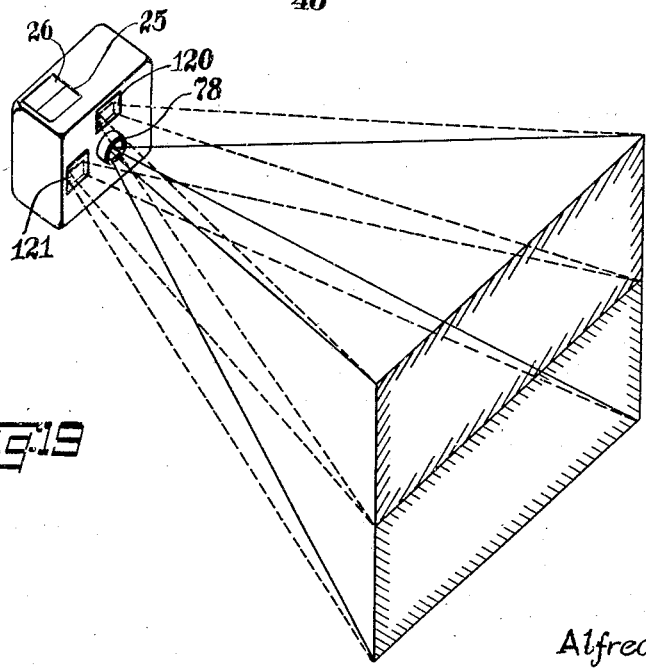

Fig. 18 shows in axonometric projection the moving elements of this finder, i. e., the two lenses which, when being moved, deviate one beam in a horizontal direction for range finding purposes and the other beam in a vertical direction for purposes of depicting supplementary portions of the object to be photographed, both movements occurring simultaneously in coordination with the focusing movement of the camera lens; and Fig. 19 shows the elimination of parallaxis between camera lens and finder by the simple expedient of merely placing the camera lens into a preferred position.

Like number of references denote similar parts throughout the several views and the following specification.

1. *General layout*

The general layout of the finder can best be seen in Fig. 1. The field lenses 25 and 26 are mounted side by side in a substantially horizontal plane. These field lenses are positive lenses and, as shown, they are plane-convex with the plane surface on top. This, however, is not strictly necessary and bi-convex lenses may also be used, if so desired. The advantage of a plane-convex lens is that, if it is used in connection with a plane-convex image forming lens in such a way that the curved surfaces of both lenses face each other, spherical aberration is minimized. At least one side of both field lenses must be cut off so that the two lenses can be used in adjacent arrangement, but in practice, it is, of course, preferable to have all four sides trimmed as shown.

Immediately underneath the first field lens 25 is the first mirror 27 which reflects the substantially vertical lines of vision in a forward direction. In front of mirror 27 is the second mirror 28 which reflects the now forwardly directed line of vision in a lateral direction. In front of mirror 28 is the first image forming lens 29, and in front of this lens is a third mirror 30 which reflects the line of vision again in a forward direction which, obviously, must be substantially parallel to the optical axis of the camera lens. The camera lens is not shown in Fig. 1, but its position will be shown on subsequent figures.

Below the second field lens 26 is a fourth mirror 31 which reflects the line of vision in a forward direction in the same manner as the aforementioned mirror 27. However, mirror 31 is arranged at a considerably lower level than mirror 27 so that the light beam reflected thereby will have no difficulty passing below the lower edge of the aforementioned second mirror. In front of mirror 31 is the second image forming lens 32.

A device of this character has the great advantage that only a very small number of optical elements is being used, i. e., a field lens and an image forming lens for each system, one forwardly declined mirror for each system, which acts as an image erecting element, and two additional parallel mirrors for the first system, by means of which the necessary amount of lateral parallaxis is introduced into the system so that it can be used for range finding purposes.

2. *Barrel shaped distortion*

Finders of this general type are necessarily composed of simple uncorrected lenses and are, therefore, afflicted with certain aberrations, the worst of which is barrel shaped distortion. I have schematically shown in Fig. 2 a hypothetical object, composed of a number of intersecting lines forming squares; this could, for example, be a simplified picture of a building. An object of this general type is usually reproduced as shown in Fig. 3 with a considerable amount of barrel shaped distortion. This barrel shaped distortion can be minimized to a considerable degree by the proper choice of the optical centers of the two respective image forming systems. As seen in Fig. 1 the two systems are aligned in such a way that the central rays of the two light beams pass the centers of the two field lenses and of the two image forming lenses, respectively, or in other words, the centers of the field and image forming lenses of either system are aligned on a ray which passes the center of each part image, as distinguished from the alternate arrangement of having the centers of said lenses aligned on a ray which passes the center of the whole finder image. The difference between the two arrangements is shown in Figs. 3 and 4, Fig. 4 showing the arrangement in which the two lenses of each system are aligned on a central ray passing through the center of each part image. In the first case the figure is symmetrical with respect to the center of the whole image, and the picture deteriorates progressively as one approaches the margins or the corners of the image. In Fig. 4 each of the part images is symmetrical with respect to its own center and, while the images still deteriorate as one approaches the respective margins, this deterioration is very much less due to the smaller size of each part image.

3. *Light rays of both systems to be of equal length*

All finders that cover a reasonably extended field and, in particular, all finders that cover the entire field covered by the camera lens must be so laid out so that the lengths of the central rays of both part images are identical, since otherwise the magnification of the two part images will be slightly different, and it will not be possible to have all points of one part image in register with the corresponding points of the other part image in spite of the fact that these points may lie in one plane and, therefore, have the same distance from the camera. The proportions of my finder can best be shown with the aid of Figs. 5 and 6.

If the observer holds his head substantially vertically above the two field lenses 25 and 26, the distance from the eyes of the observer to the field lenses will automatically be of equal length.

The optical distance from the center of each field lens to the center of each image forming lens must be substantially equal to the focal length of said image forming lens. This means that the distance from the center of field lens 25 to mirror 27, to mirror 28 and to the center of image forming lens 29 must be equal to the focal length of said image forming lens and, by the same token, the distance from the center of field lens 26, to mirror 31, and to the center of image forming lens 32 must also equal the focal length of said image forming lens. In other words, distances $UB+BC+CD$ must be equal to distance $SG+GH$. One field lens has the same focal length as the other field lens and one image forming lens has the same focal length as the other image forming lens.

The optical distance from the object to be photographed to each image forming lens must also be identical. With reference to Figs. 5 and 6 it can be seen that the distance from the object to be photographed to point E is obviously equal to the distance from the object to point I. Therefore, it is merely necessary to make distance ED=distance HI in order to meet this last condition.

It can be seen that the finder shown in Figs. 1, 5 and 6 will meet these conditions, and it can also be seen that the two beams of light emerging from the two systems have not only a horizontal displacement M, which is usually called the base distance of the finder, but also a vertical displacement N. This verical displacement serves no useful purpose and it will be shown later that means have to be employed to eliminate its effect.

4. *Means to make both part image systems cover supplementary parts of the finder image—Infinity*

In the interest of simplicity the two light rays emerging from the finder in Fig. 1 are shown to be parallel. This is not strictly correct since a finder built in this manner would merely show two almost identical images within each field lens. What is really required is a finder that shows the upper half of the image within field lens 25 and the lower part of the image within field lens 26. In order to accomplish this the two beams emerging from the finder must be slightly inclined, one beam emerging in a slightly upward and the other emerging in a slightly downwardly inclined direction. This can be seen in Figs. 5 and 6 where the finder is shown as adjusted for infinity. In this condition, both the lowest marginal ray of the upper or left light beam and the highest marginal ray of the lower or right light beam must be parallel to each other and to the optical axis of the finder lens, i. e., substantially horizontal. This condition is shown in Fig. 6. Obviously a strip of the width N will not be shown on either part image system, but in the infinity position the omission of a narrow strip is manifestly of no consequence. As will be shown later, means are employed to correct for this omission, whenever the finder is used for closer distances.

If the angle covered by the camera lens is called $\epsilon$, it will be obvious that the angle covered by the upwardly inclined beam will be ½ $\epsilon$, and the angle covered by the downwardly inclined beam will also be ½ $\epsilon$. This, in turn, means that the central ray of either beam will have an inclination against the horizontal of ¼ $\epsilon$, and that mirror 27 will be inclined by an angle of $45° + \frac{1}{8} \epsilon$ against the vertical line of vision, and that mirror 31 will be inclined by $45° - \frac{1}{8} \epsilon$ against the vertical line of vision.

5. *Elimination of perspective distortion*

Figure 7:
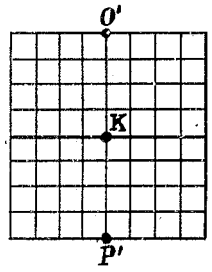
Figure 8:
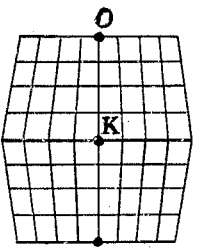
Figure 10:
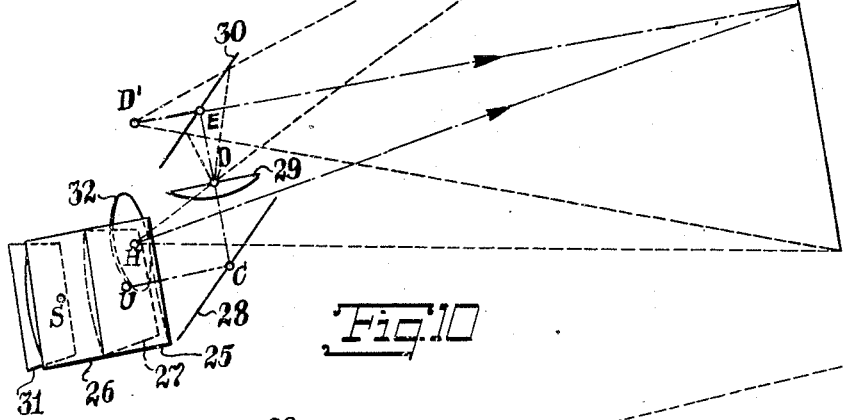

The inclination of the two light beams has the undesired effect of introducing a certain perspective distortion. For example, if we look at a building, the part of the building seen in the upper part image seems to be leaning over backwards, and the other part of the image seen in the lower part image seems to lean over forward. I have shown this schematically in Figs. 7 and 8, Fig. 7 showing a number of rectangular squares which may schematically represent a building, and Fig. 8 showing the appearance of said building in the finder.

Figure 9:
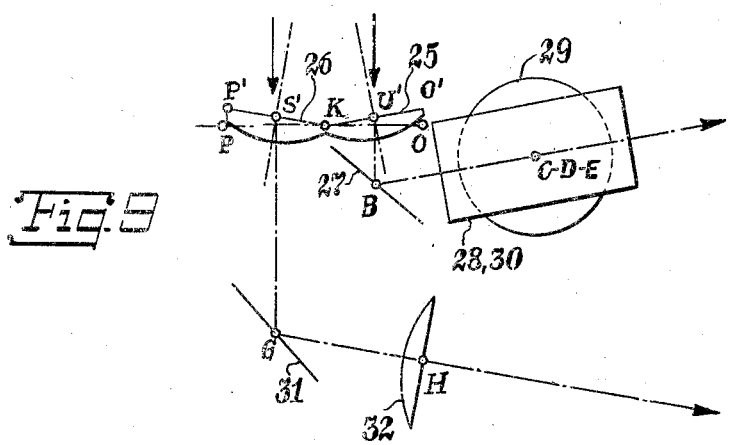

This distortion can be eliminated by inclining the optical axis of the two field lenses with respect to the vertical line of vision as I have shown in Fig. 9. As pointed out before, the optical distance between each image forming lens and its respective field lens or, more precisely, between each image forming lens and the upper plane surface of its field lens, line PO of Fig. 6, is equal to the focal length of the image forming lens. Consequently, the two images formed by the two image forming lenses receive no magnification by the field lenses. By inclining the field lenses, as shown in Fig. 9, this condition is not changed along the parting line K in Fig. 9, but it is slightly changed at the outer margins P' and O' in Fig. 9. In other words, the regions along the parting line continue to receive no magnifications, but a slight amount of magnification is introduced in the other parts of the image, the amount of magnification gradually increasing in proportion to the distance of each image element from the parting line and the image elements on the outer margins receiving the most magnification. It will be clear that, if the figure shown in Fig. 8 is subjected to a variable amount of magnification starting from zero at the parting line and increasing towards the outer margins and if this magnification is chosen correctly, the original proportions shown in Fig. 7 can be restored. The amount of tilt necessary to restore the original condition can probably be deduced theoretically, but I have found by experience that an angle of approximately 10° is just right.

6. *Beam deviating device for range finding purposes*

There are two principal methods of moving one of the part images in order to bring it into register with the other one, i. e., either by tilting one of the mirrors or by shifting one of the lenses parallel to itself in a direction at right angles to its axis. Referring to Fig. 5, I could, for example, tilt mirror 30 around point E. The method described in detail in Patent #2,303,767, issued to me on December 1, 1942, is fully applicable to this case.

Figure 12:
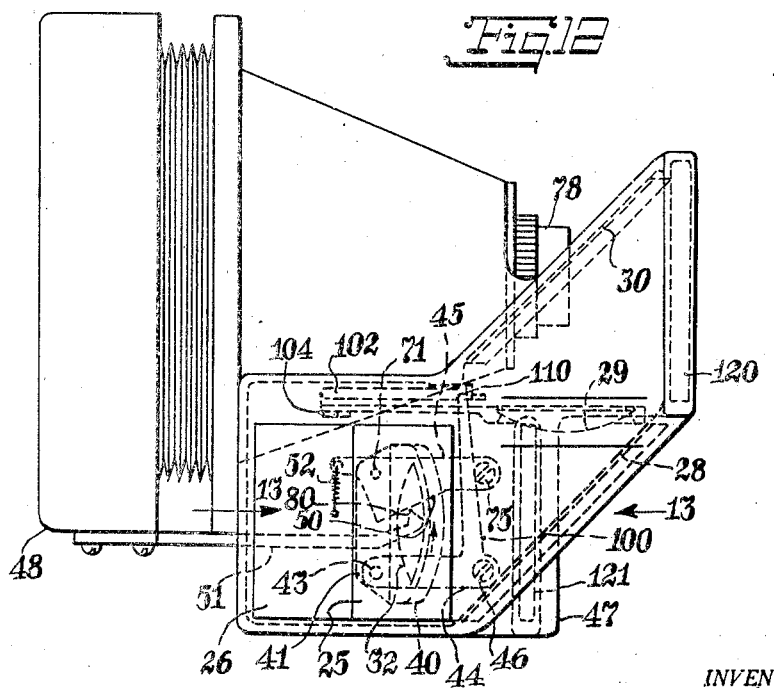
Fig. 12 shows a plan view, Fig. 13 a sectional view along the plane of line 13—13 in Fig. 12, and Fig. 14 a front view of camera equipped with a range finder according to this invention.
Figure 13:
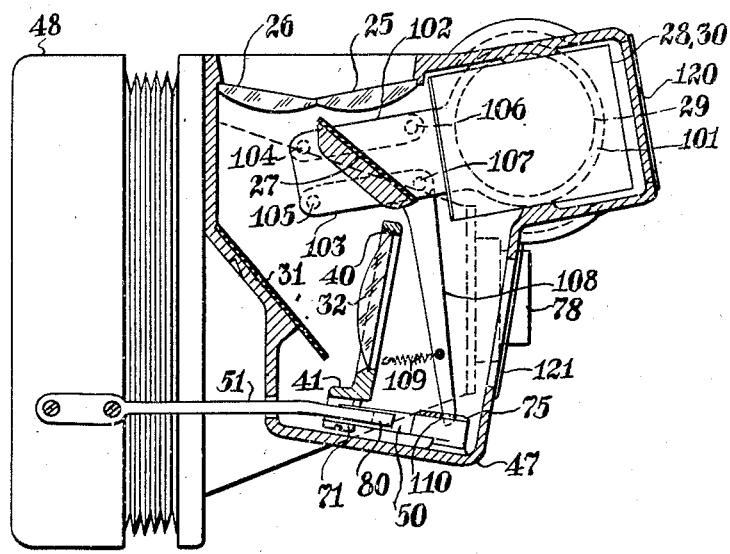

The other possibility, which I prefer for certain reasons, is to shift lens 32 in a direction at right angles to the axis of the camera lens, or, referring to Fig. 6, at right angles to the plane of the drawing. For this purpose I have devised the following construction:

This device is illustrated in Fig. 12 which shows a top view, and in Fig. 13 which shows a sectional side view along the plane of line 13—13 in Fig. 12. The lens 32 is mounted in a frame 40 equipped with two lugs 41. These lugs are fastened to pivots or shoulder screws 43 and 71 which, in turn, connect frame 40 to two parallel levers 44 and 45, respectively. These levers are rotatably fastened by shoulder screws 46 and 75 to the front part 47 of a camera housing. 48 is a camera back. The front part supports the camera lens 70, and the camera back 48 contains the sensitized film. The distance between these two parts is adjustable for focusing purposes, and they are connected by an extensible, but light-tight, connection such as a bellows. It will be understood that Figs. 12 and 13 are more or less diagrammatical and that the various parts are not necessarily shown in their real proportions.

As can be seen, lever 45 is equipped with a straight cam surface 50, the extension of which passes through the center of pivot 75. A bracket 61 is fastened to the camera back, supporting a knife edge 80 which cooperates with the straight cam surface 59. The entire supporting structure for lens 32 is biased by a little spring 52, so that cam surface 59 always presses against knife edge 80. It will be clear that, if the distance between the camera front 47 and the camera back 48 is increased in order to focus a closer distance, then lens 32 will move parallel to itself in the direction shown by the arrow, see Fig. 12. It can be demonstrated that by choosing the angle of the straight cam surface 50 and the distance between points 75 and 80 properly, complete agreement between range finder coincidence and camera focusing can be obtained. This is clearly explained in Figs. 15, 16 and 17.

Fig. 15 shows diagrammatically the two finder systems for the two beams, the camera lens 78 and the beam deviating mechanism for lens 32. The reflecting systems for both part images have been temporarily omitted, and the two image forming lenses 29 and 32 and the two field lenses 25 and 26 are shown in the position which they would assume without the reflectors. For reasons which will become apparent later, the optical system for the first beam is assumed to be arranged directly above the center line of the camera lens 78.

While these elements are shown in Fig. 15 as in the infinity position, they are shown in Fig. 16 as focused for a relatively close object. The various distances and angles are defined as follows:

$a$ is the distance of the object to be photographed from the optical center of the camera lens;

$b$ is the corresponding distance of the sensitized film from the optical center of the camera lens;

F is the focal length of the camera lens. In Fig. 15, i. e., in the infinity position, there is, of course, $b=F$;

$\Delta F$ is the increment of the film lens distance for closeups; in other words, we have $b=F+\Delta F$;

$c$ is the distance by which the plane of the two field lenses would be disposed behind the optical center of the camera lens if one would omit the two reflecting systems;

$f$ is the focal length of the two image forming range finder lenses;

M is the base distance of the range finder, i. e., the horizontal displacement of the two beams in the infinity position;

$i$ is the distance by which the lens 32 must be shifted in order to bring the two part images into register;

$r$ is the length of lever 44 or 45;

L is the distance between the pivot 75 of lever 45 and knife edge 80 in the infinity position;

$\alpha$ is the angle between the two range finder beams as focused for an object at the distance $a$;

$\beta$ is the angle, in the infinity position, between the straight cam surface 59 and a line passing pivot 75 parallel to the camera lens axis.

$j$ is the angle of rotation of levers 44 and 45 necessary in order to shift lens 32 the required distance $i$.

If, for focusing purposes, one increases the distance between the camera front and the camera back, point 80, i. e., the point of contact between the knife edge and the straight cam surface, in Fig. 15, will move to point 80' in Fig. 16. Similarly, point 71 will move to point 71', thereby shifting the lens 32 by the required distance $i$.

Since the two reflecting systems are removed temporarily, the two part images are no longer seen in adjacent arrangement, but obviously the two part images would be in register as long as a point in the center of the camera field is projected by either image forming lens into the center of its respective field lens.

In the infinity position, shown in Fig. 15, any point on the center line of the camera lens will be projected by either range finder lens into the center of field lenses 29 and 32, respectively. For close distances a point V on the camera lens axis, Fig. 16, will still be projected by lens 29 into the center of field lens 25, but lens 32 will project the same object into a point disposed at a certain distance from the center of field lens 26. If one wants to restore the original condition, i. e., have point V projected into the center S of field lens 26, one has to shift image forming lens 32 by the distance $i$ as shown in Fig. 16.

The two triangles RST and VSU are similar and, therefore $$i:f=m:a+c, \text{ or } a=\frac{mf}{i}-c \qquad \text{(Equation 1)}$$

Points 75, 71 and 71', and 80 and 80' are shown at a somewhat enlarged scale in Fig. 17. A line is drawn at right angles to the extension of line 80—75 and the point of intersection is called 85. Triangle 75—80—80' gives us the following relations:

Distance $80'-85=\Delta F \sin \beta$
Distance $80-85=\Delta F \cos \beta$
Distance $85-75=L+\Delta F \cos \beta$ $$\tan j=\frac{\Delta F \sin \beta}{L+F \cos \beta} \qquad \text{(Equation 2)}$$

Triangle 75—71—71' gives us the additional relation:

$i=rj$ or, since $j$ is very small;

$$i=r \tan j \qquad \text{(Equation 3)}$$

These three equations can be transformed to read:

$$a=\frac{1}{\Delta F}\cdot\frac{fmL}{r \sin \beta}+\frac{fm}{r \tan \beta}-c \qquad \text{(Equation 4)}$$

($a$) can also be obtained from the equation of the camera lens:

$$\frac{1}{a}+\frac{1}{b}=\frac{1}{f}$$

or, since $b=F+\Delta F$ $$a=\frac{1}{\Delta F}F^2+F \qquad \text{(Equation 5)}$$

Equations 4 and 5 can be reconciled, if we make at all times $$F^2=\frac{fmL}{r \sin \beta} \text{ and } F=\frac{fm}{r \tan \beta}-c$$

or $$\tan \beta=\frac{fm}{r(F+c)} \qquad \text{(Equation 6)}$$

$$L=\frac{F^2 r}{fm} \sin \beta \qquad \text{(Equation 7)}$$

These two formulae prove that a beam deviating device of this type can be built which is very simple and inherently capable of synchronizing the action of the range finder with the focusing movement of the camera lens with a high degree of accuracy.

7. Beam deviating device for both beams

As can be seen in Figs. 5 and 6 the two beams are not only displaced in the direction of the base distance M of the range finder, horizontally in this case, but also in a direction at right angles to M, vertically, in this case; the amount of this displacement has been called N. While the displacement M is necessary for range finding purposes, the displacement N serves no useful purpose and should, therefore, be kept as small as possible. In most instances, for example in the case shown in Fig. 5 and 6, it is not possible to reduce N to zero, without conflicting with the more important condition of equal beam lengths. The consequence is that a narrow strip, of the width N, of the object will not be shown by either of the part image systems. N is usually no more than 2", and the omission of this narrow strip will, therefore, be unnoticeable as long as one deals with objects at or near infinity. For closeups, however, this omission cannot be tolerated since, for example, focusing at the face of a person the mouth may be missing.

It becomes, therefore, necessary to introduce an additional beam deviating device which must be constructed in such a way that at least one of the beams is automatically tilted in the direction of N in such a way that the lower marginal ray of the upper or left beam and the upper marginal ray of the lower or right beam intersect in the plane upon which the camera lens has been focused, i. e., the same plane which is portrayed by both part image systems in such a way that the two supplementing image halves are in register.

Figure 11:
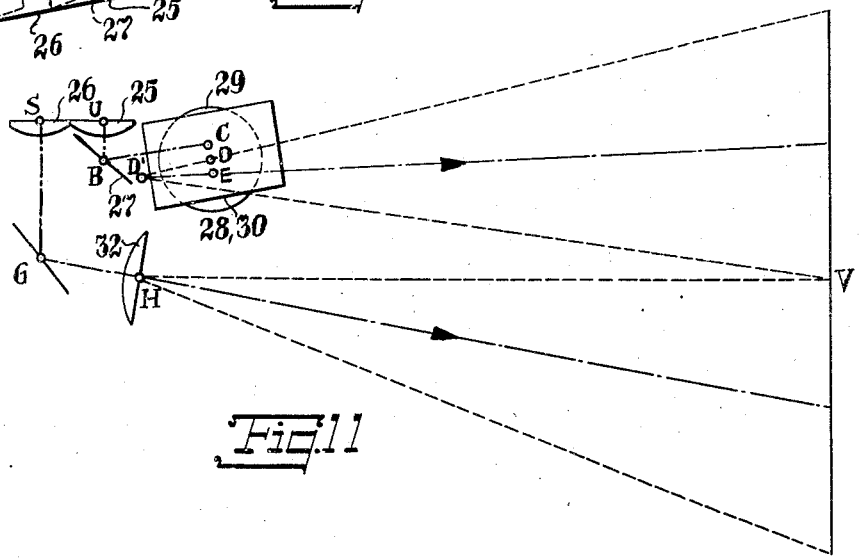

One may deviate either the upper or the lower beam, and one may again choose to do so either by tilting at least one mirror or by shifting at least one lens. I prefer to tilt the upper beam downward by shifting lens 29 vertically. This is shown in Fig. 11, where image forming lens 29 occupies a position noticeably lower than in Fig. 6 and where, consequently, the upper beam is tilted downwardly in such a way that its lower marginal ray meets the upper marginal ray of lower beam at point V. The central ray of the upper beam is intercepted by mirror 30 at point E, reflected slightly upwardly, but almost at right angles to the plane of the drawing, meets lens 29 at point D, mirror 28 at point C, and is here reflected into mirror 27 and field lens 25.

The mechanism necessary for shifting the beam in this manner may be identical in all details with the mechanism described above for the other beam shifting device used for range finding purposes, and the dimensions can be derived from the same formula except, of course, that the distance N must be substituted for the distance M. Another and slightly more convenient way of accomplishing the same result is to connect the vertical movement of lens 29 to the horizontal movement of lens 32 in such a way that the ratio of the movement of lens 29 to the movement of lens 32 equals N:M. The best known means to connect two elements moving at right angles are a pair of bevel gears, and bevel gears could very well be used for this purpose. However, since the movement of both lenses is quite small, complete bevel gears are not necessary, since only one tooth of either gear would be really be in action. We can, therefore, reduce the entire mechanism to two pivoted levers which may perform small rotary movements in planes that are substantially at right angles to each other. This construction is shown in Figs. 12 and 13, and the mechanism which moves the two lenses is again shown in axonometric projection in Fig. 18.

In the lower part of this figure one sees again the beam deviating device for the lower beam, said beam deviating device being used for range finding purposes. It will be noted that lens 32 is supported by frame 40 which, in turn, is supported by pivoted levers 44 and 45. The straight cam surface 50 of lever 45 is also visible, and this straight cam surface cooperates with the knife edge 80 which is, in turn, supported by a bracket 51. The entire assembly is biased by spring 52. Fixedly attached to lever 44 is an extended arm 100 which is also shown in Fig. 12.

The beam deviating device for the upper beam comprises frame 101, which supports lens 29. This frame, in turn, is supported by two pivoted arms 102 and 103. Pivots 104 and 105 serve to connect arms 102 and 103, respectively, to frame 101, and pivots 106 and 107 connect the other ends of arms 102 and 103 to the camera housing 47. Fixedly attached to arm 103 is the extended arm 108. A spring 109 biases arm 108 and therewith the entire lens supporting system for lens 29. It can be seen that arm 108 is in contact with arm 100 at point 110. The two movements of lens 29, in a vertical direction, and lens 32, in a horizontal direction, will have the correct ratio if the distance from pivot 46 to the contact point 110 of lever 100 has the same ratio to the distance from pivot 107 to the contact point 110 of lever 108 as N:M, i. e., the length of the two levers between their respective pivots and their common contact point must be in inverse proportion to the respective horizontal or vertical displacement of the two light beams. It will be clear from Figs. 12, 13 and 18 that, if lens 32 travels in the direction indicated by the arrow, i. e., to the right, lever 44 will perform a corresponding movement causing a slight rotation of the extended arm 100 in a substantially horizontal plane. Due to the cooperative contact between arm 100 and 108, arm 108 will perform a slight rotary movement in a vertical plane causing lens 29 to travel vertically downwardly.

8. Means to compensate for parallaxis between the range finder and camera lens The two spaced beams of the range finder are by necessity displaced with respect to the beam emanating from the camera lens. The fields covered by the camera lens and the range finder, respectively, show, therefore, a small but by no means negligible discrepancy. Numerous proposals have been made to compensate for this difference, for example, by means of sliding, cam actuated, masks in the plane of the view finder image. Many of these proposed means are, of course, applicable to my range finder.

Figure 14:
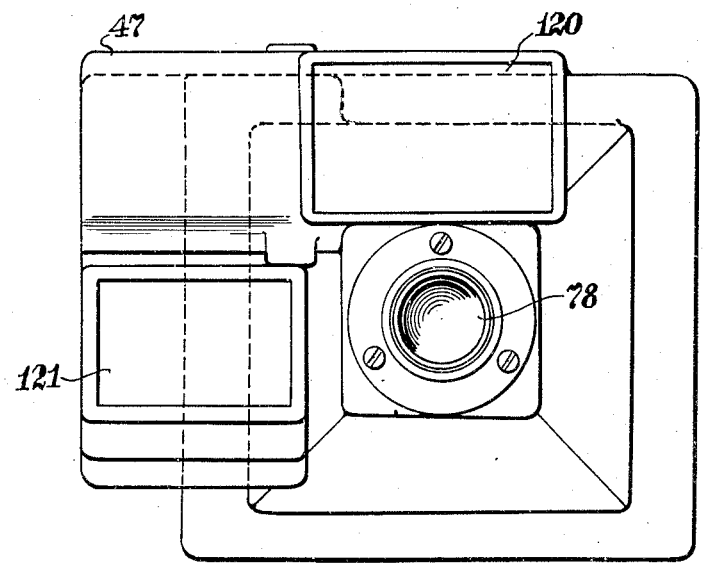

However, in the case of a range finder such as shown, it can be demonstrated that the effect of the parallaxis can be eliminated without the introduction of additional mechanical means merely by a judicious choice of the location of the camera lens with respect to the range finder. A plan view of a camera, thus constructed, is shown in Fig. 12, while Fig. 13 shows a sectional side view along the plane of line 13—13 in Fig. 12, and Fig. 14 shows a front view of the camera, facing the camera lens.

As can be seen, the camera lens 78 is disposed vertically below the window 120 for the upper beam and on the same horizontal level as the window 121 for the lower beam.

The three light beams, i. e., the camera lens beam and the two range finder beams are again shown schematically in Fig. 19. It will be clear that the upper range finder beam is inherently free from horizontal parallaxis with respect to the field covered by the camera lens since, during focusing, the beam deviating mechanism merely makes the beam perform a slight vertical sweep. It will also be clear that the lower range finder beam is always inherently free from vertical parallaxis with respect to the field covered by the camera lens, since the beam deviating mechanism merely makes the beam perform a horizontal sweep for range finding purposes. It will, furthermore, be clear that the vertical parallaxis of the upper beam will be eliminated by the beam deviating mechanism shown in Fig. 13, and that the horizontal parallaxis of the lower beam will be eliminated by the beam deviating mechanism in Fig. 12. In other words, one has the picture, shown in Fig. 19, where both range finder beams supplement each other and cover substantially the same field as covered by the camera lens.

It is obvious that many changes of form, proportions and minor details of construction may be resorted to without departing from the principles or sacrificing any of the advantages of the invention as defined in the appended claims.

What I claim as new is:

1. In a camera with a focusable lens, a range finder of the split image, brilliant, type comprising a supporting structure, a first optical system for one part image, and a second optical system for the other part image, both systems in cooperative relationship with each other, the first system including a first field lens into which the observer looks and which is arranged in a substantially horizontal plane, substantially at right angles to the substantially vertical line of vision, a first reflector, a second reflector, a first positive image forming lens, and a third reflector, these five elements arranged in that order and so disposed within said supporting structure that the reflectors are inclined by angles of substantially 45° against the central ray of the system, said central ray emerging finally from said third reflector in a forward and substantially horizontal direction, substantially parallel to the axis of the camera lens, the first image forming lens forming a real image of one part of the object to be photographed substantially in the plane of said first field lens, the second system including a second field lens into which the observer looks and which is arranged adjacent to said first field lens in a substantially horizontal plane, substantially at right angles to the substantially vertical line of vision, a fourth reflector, and a second image forming lens, these three elements arranged in that order and so disposed within said supporting structure that the reflector is inclined by substantially 45° against the central ray of the second system, said central ray of the second system emerging finally from said image forming lens in a forward and substantially horizontal direction, substantially parallel to the axis of the camera lens, the second image forming lens forming a real image of the other part of the object to be photographed substantially in the plane of second field lens, the two part image systems so arranged within said supporting structure as to depict substantially supplementary parts of said object in adjacent relationship, the boundary line between the two adjacent field lenses forming a stationary parting line between the two part images, independent of small movement of the observer's head, and means to shift, in coordination with the focusing movement of the camera lens, the part image formed by one optical system into register with the part image formed by the other optical system, the magnitude of said shift being indicative of the distance of said object from the camera.

2. A range finder according to claim 1, said first reflector mounted underneath said first field lens and being forwardly inclined, forming an angle of substantially 45° with the substantially vertical line of vision and reflecting it in a forward direction substantially parallel to the axis of the camera lens, said second reflector arranged in front of said first reflector in a substantially vertical plane, forming an angle of substantially 45° with the axis of the camera lens and with the now forwardly directed line of vision, reflecting it into a lateral, substantially horizontal, direction, said first image forming lens, laterally offset in a horizontal direction with respect to said second reflector and arranged in a substantially vertical plane substantially parallel to the axis of the camera lens, and said third reflector laterally offset with respect to said second reflector in the same horizontal direction as, but farther away than, said first image forming lens, arranged in a plane substantially parallel to said second reflector and reflecting the line of vision again forwardly in a substantially horizontal direction substantially parallel to the axis of the camera lens.

3. A range finder according to claim 1, said fourth reflector mounted underneath said second field lens, said reflector being forwardly inclined, forming an angle of substantially 45° with the substantially vertical line of vision and reflecting it in a forward direction substantially parallel to the axis of the camera lens, and said second image forming lens arranged in front of said fourth reflector in a substantially vertical plane, substantially at right angles to the axis of the camera lens.

4. A range finder according to claim 1, said first reflector mounted underneath said first field lens and being forwardly inclined, forming an angle of substantially 45° with the substantially vertical line of vision and reflecting it in a forward direction substantially parallel to the axis of the camera lens, said second reflector arranged in front of said first reflector in a substantially vertical plane, forming an angle of substantially 45° with the axis of the camera lens and with the now forwardly directed line of vision, reflecting it into a lateral, substantially horizontal, direction, said first image forming lens, laterally offset in a horizontal direction with respect to said second reflector and arranged in a substantially vertical plane substantially parallel to the axis of the camera lens, said third reflector laterally offset with respect to said second reflector in the same horizontal direction as, but farther away than, said first image forming lens, arranged in a plane substantially parallel to said second reflector and reflecting the line of vision again forwardly in a substantially horizontal direction substantially parallel to the axis of the camera lens, said fourth reflector mounted underneath said second field lens, said reflector being forwardly inclined, forming an angle of substantially 45° with the substantially vertical line of vision and reflecting it in a forward direction substantially parallel to the axis of the camera lens, and said second image forming lens arranged in front of said fourth reflector in a substantially vertical plane, substantially at right angles to the axis of the camera lens, the two last named elements arranged at a lower level than the other elements.

5. A range finder according to claim 1, the centers of said two field lenses coinciding with the centers of their respective part images.

6. A range finder according to claim 1, the central rays of the two part image systems, passing through the centers of said two image forming lenses, respectively, and after being reflected by the respective reflectors intermediate the field lens and image forming lens of either optical system, passing through the centers of their respective part images 7. A range finder according to claim 1, said two field lenses being of equal focal length, said two image forming lenses being of equal focal length, and the optical distance between either field and image forming lens being substantially equal to the focal length of the image forming lens.

8. A range finder according to claim 1, the length of the central ray of said first image system consisting of the distance of the object to be photographed to said third reflector plus the distance from said third reflector to said first image forming lens, being equal to the length of the central ray of said second part image system from the object to be photographed to said second image forming lens.

9. A range finder according to claim 1, the arrangement whereby the two part image systems depict substantially supplementary parts of the object to be photographed comprising means to make the central ray of said first system emerge in a slightly upwardly inclined direction, and means to make the central ray of said second system emerge in a slightly downwardly inclined direction.

10. A range finder according to claim 1, the arrangement whereby the two part image systems depict substantially supplementary parts of the object to be photographed comprising the arrangement of said first reflector underneath said first field lens in a forwardly inclined plane forming an angle of $$45° + \frac{\epsilon}{8}$$

with the substantially vertical line of vision, $\epsilon$ being the angle covered by the camera lens, said first reflector thereby reflecting the line of vision in a forward and slightly upward direction forming an angle of $$\frac{\epsilon}{4}$$

with a horizontal plane parallel to the axis of the camera lens, and the arrangement of said fourth reflector, underneath said second field lens, in a forwardly inclined plane forming an angle of $$45° - \frac{\epsilon}{8}$$

with the substantially vertical line of vision, thereby reflecting said line of vision in a forward and slightly downward direction forming an angle of $$\frac{\epsilon}{4}$$

with a horizontal plane parallel to the axis of the camera lens.

11. A range finder according to claim 1, the arrangement whereby the two part image systems depict substantially supplementary parts of the object to be photographed comprising means to make the central ray of said first system emerge in a slightly upwardly inclined direction, and means to make the central ray of said second system emerge in a slightly downwardly inclined direction, the central ray of either part image system passing through the centers of its respective field and image forming lens, the optical axis of said field lens being inclined against the central ray, the optical distance from each image forming lens to that portion of its field lens portraying portions of the part image near the parting line being substantially equal to the focal length of said image forming lens, and the optical distance from each image forming lens to that portion of its field lens portraying portions of the part image far away from the parting line and near the outer margins of said part image being larger than the focal length of said image forming lens, whereby the portions of the part image near the parting line receive substantially no magnification, but the portions far away from the parting line receive sufficient magnification to compensate for the perspective distortion introduced by the upwardly or downwardly inclined direction of the two central rays of the two part image systems.

12. A range finder according to claim 1, said last mentioned means comprising mechanism to shift one of the image forming lenses parallel to itself and in a direction substantially at right angles to its optical axis in coordination with the focusing movement of the camera lens.

13. In a camera comprising two main camera parts in adjustable relation, a camera lens supported by one of said parts, and sensitized film by the other of said parts, a range finder of the split image, brilliant, type comprising a supporting structure, a first optical system for one part image and a second optical system for the other part image, both systems in cooperative relationship with each other, the first system including a first field lens into which the observer looks and which is arranged in a substantially horizontal plane, substantially at right angles to the substantially vertical line of vision, a first reflector, a second reflector, a first positive image forming lens, and a third reflector, these five elements arranged in that order and so disposed within said supporting structure that the reflectors are inclined by angles of substantially 45° against the central ray of the system, said central ray emerging finally from said third reflector in a forward and substantially horizontal direction, substantially parallel to the axis of the camera lens, the first image forming lens forming a real image of one part of the object to be photographed substantially in the plane of said first field lens, the second system including a second field lens into which the observer looks and which is arranged adjacent to said first field lens in a substantially horizontal plane, substantially at right angles to the substantially vertical line of vision, a fourth reflector and a second image forming lens, these three elements arranged in that order and so disposed within said supporting structure that the reflector is inclined by substantially 45° against the central ray of the second system, said central ray of the second system emerging finally from said second image forming lens in a forward and substantially horizontal direction, substantially parallel to the axis of the camera lens, the second image forming lens forming a real image of the other part of the object to be photographed substantially in the plane of the second field lens, the two part image systems so arranged within said supporting structure as to depict substantially supplementary parts of said object in adjacent relationship, and a beam deviating device including means to shift, in coordination with the focusing movement of the camera lens, the part image formed by one optical system into register with the part image formed by the other optical system, the magnitude of said shift being indicative of the distance of said object from the camera, said means including a frame for one of said image forming lenses, two lugs on said frame, two parallel levers of equal length, each lever being pivotally secured to one of said lugs with one of its ends, the other end of each lever being pivotally connected to one of said main camera parts, one of said levers being provided with a straight cam surface, the extension of which passes through the center of its pivotal connection to said camera part, and a member with a knife edge fixedly secured to said other main camera part, said knife edge adapted to cooperate with said straight cam surface.

14. In a camera according to claim 13, the dimensions of the beam deviating device as given by the two formulae:

$$\tang \beta = \frac{fM}{r.(F+C)}$$

$$L = \frac{F^2 r}{fM} \sin \beta$$

Where

F is the focal length of the camera lens,
L is the length of the straight cam surface between the bearing of the cam supporting lever and the knife edge, in the infinity position,
$\beta$ is the angle in the infinity position between the straight cam surface and a line parallel to the camera lens axis passing said lever bearing,
$f$ is the focal length of the image forming lens of the range finder,
$r$ is the length of either parallel lever supporting the frame of the image forming lens,
C is the distance by which the plane of the finder image would be positioned behind the optical center of the camera lens, if the reflecting system would be temporarily omitted, and
M is the base distance of the range finder.

15. In a camera comprising two main camera parts in adjustable relation, a camera lens supported by one of said parts, and sensitized film by the other of said parts, a range finder of the split image, brilliant, type comprising a supporting structure, a first optical system for one part image and a second optical system for the other part image, both systems in cooperative relationship with each other, the first system including a first field lens into which the observer looks and which is arranged in a substantially horizontal plane, substantially at right angles to the substantially vertical line of vision, a first reflector, a second reflector, a first positive image forming lens, and a third reflector, these five elements arranged in that order and so disposed within said supporting structure that the reflectors are inclined by angles of substantially 45° against the central ray of the system, said central ray emerging finally from said third reflector in a forward and substantially horizontal direction, substantially parallel to the axis of the camera lens, the first image forming lens forming a real image of one part of the object to the photographed substantially in the plane of said first field lens, the second system including a second field lens into which the observer looks and which is arranged adjacent to said first field lens in a substantially horizontal plane, substantially at right angles to the substantially vertical line of vision, a fourth reflector and a second image forming lens, these three elements arranged in that order and so disposed within said supporting structure that the reflector is inclined by substantially 45° against the central ray of the second system, said central ray of the second system emerging finally from said second image forming lens in a forward and substantially horizontal direction, substantially parallel to the axis of the camera lens, the second image forming lens forming a real image of the other part of the object to be photographed substantially in the plane of the second field lens, means to deviate the beam of one part image system in order to make the two part images represent at all distances a complete finder image composed of two supplementing halves of the object to be photographed, and means to deviate the beam of the other part image system in order to bring these supplementing parts of the finder image into register for range finding purposes, the second beam being deviated in a direction perpendicular to the direction in which the first beam is being deviated, and means to synchronize both beam deviating means with the focusing movement of the camera lens.

16. A range finder according to claim 15, including means to deviate the beam of said first part image system in a vertical direction and the beam of said second part image system in a horizontal direction.

17. A range finder according to claim 15, including means to deviate the beam of said first part image system in a vertical direction comprising means to move said first image forming lens in a vertical direction and the beam of said second part image system is a horizontal direction comprising means to move said second forming lens in a horizontal direction.

18. A range finder according to claim 15, including means to deviate the beam of said first part image system in a vertical direction comprising means to move said first image forming lens in a vertical direction and the beam of said second part image system in a horizontal direction comprising means to move said second image forming lens in a horizontal direction, the ratio of the vertical movement of the first lens to the horizontal movement of the second lens being the same as the ratio of the vertical displacement of the two light beams emerging from the finder to their horizontal displacement.

19. A range finder according to claim 15, including means to deviate the beam of said first part image system in a vertical direction comprising means to move said first image forming lens in a vertical direction, said last mentioned means comprising a frame for said lens, two lugs attached to said frame, two parallel levers of equal length, each lever being pivotally secured to one of said lugs with one of its ends, the other end of each lever being pivotally connected to one of said camera parts, the center lines of said pivots being substantially horizontal and at right angles to the axis of the camera lens, and means to deviate the beam of said second part image system in a horizontal direction comprising means to move said second image forming lens in a horizontal direction, said last mentioned means comprising a frame for said lens, two lugs attached to said frame, two parallel levers of equal length, each lever being pivotally secured to one of said lugs with one of its ends, the other end of each lever being pivotally connected to one of said camera parts, the center lines of said pivots being substantially vertical and at right angles to the axis of the camera lens.

20. A range finder according to claim 15, including means to deviate the beam of said first part image system in a vertical direction comprising means to move said first image forming lens in a vertical direction, said last mentioned means comprising a frame for said lens, two lugs attached to said frame, two parallel levers of equal length, each lever being pivotally secured to one of said lugs with one of its ends, the other end of each lever being pivotally connected to one of said camera parts, the center lines of said pivots being substantially horizontal and at right angles to the axis of the camera lens, one of said levers being equipped with an arm extending in a vertical plane and in a direction at right angles to a line connecting its two pivots, the center line of said arm passing substantially through the center of the pivot fastened to one of said camera parts, and means to deviate the beam of said second part image system in a horizontal direction comprising means to move said second image forming lens in a horizontal direction, said last mentioned means comprising a frame for said lens, two lugs attached to said frame, two parallel levers of equal length, each lever being pivotally secured to one of said lugs with one of its ends, the other end of each lever being pivotally connected to one of said camera parts, the center lines of said pivots being substantially vertical and at right angles to the axis of the camera lens, one of said levers being equipped with an arm extending in a horizontal plane and in a direction at right angles to a line connecting its two pivots, the center line of said arm passing substantially through the center of the pivot fastened to one of said camera parts, the ends of said two extended arms being in contact with each other whereby a simultaneous movement of both image forming lenses is being effected.

21. A range finder according to claim 15, including means to deviate the beam of said first part image system in a vertical direction comprising means to move said first image forming lens in a vertical direction, said last mentioned means comprising a frame for said lens, two lugs attached to said frame, two parallel levers of equal length, each lever being pivotally secured to one of said lugs with one of its ends, the other end of each lever being pivotally connected to one of said camera parts, the center lines of said pivots being substantially horizontal and at right angles to the axis of the camera lens, one of said levers being equipped with an arm extending in a vertical plane and in a direction at right angles to a line connecting its two pivots, the center line of said arm passing substantially through the center of the pivot fastened to one of said camera parts, and means to deviate the beam of said second part image system in a horizontal direction comprising means to move said second image forming lens in a horizontal direction, said last mentioned means comprising a frame for said lens, two lugs attached to said frame, two parallel levers of equal length, each lever being pivotally secured to one of said lugs with one of its ends, the other end of each lever being pivotally connected to one of said camera parts, the center lines of said pivots being substantially vertical and at right angles to the axis of the camera lens, one of said levers being equipped with an arm extending in a horizontal plane and in a direction at right angles to a line connecting its two pivots, the center line of said arm passing substantially through the center of the pivot fastened to one of said camera parts, the ends of said two extended arms being in contact with each other whereby a simultaneous movement of both image forming lenses is being effected, the ratio of the length of said first extended arm, as measured between pivot and point of contact, to the length of said second extended arm, being the inverse of the ratio of the vertical displacement of the two light beams emerging from the finder to their horizontal displacement.

22. In a camera with a housing, a focusable lens, a range finder of the split image, brilliant type comprising a supporting structure, a first optical system for one part image and a second optical system for the other part image, both systems in cooperative relationship with each other, the first system including a first field lens into which the observer looks and which is arranged in a substantially horizontal plane, substantially at right angles to the substantially vertical line of vision, a first reflector, a second reflector, a first positive image forming lens, and a third reflector, these five elements arranged in that order and so disposed within said supporting structure that the reflectors are inclined by angles of substantially 45° against the central ray of the system, said central ray emerging finally from said third reflector in a forward and substantially horizontal direction, substantially parallel to the axis of the camera lens, the first image forming lens forming a real image of one part of the object to be photographed substantially in the plane of said first field lens, the second system including a second field lens into which the observer looks and which is arranged adjacent to said first field lens in a substantially horizontal plane, substantially at right angles to the substantially vertical line of vision, a fourth reflector and a second image forming lens, these three elements arranged in that order and so disposed within said supporting structure that the reflector is inclined by substantially 45° against the central ray of the second system, said central ray of the second system emerging finally from said second image forming lens in a forward and substantially horizontal direction, substantially parallel to the axis of the camera lens, the second image forming lens forming a real image of the other part of the object to be photographed substantially in the plane of the second field lens, means to deviate, in coordination with the focusing movement of the camera lens, the beam of one part image system in order to make the two part images represent at all distances a complete finder image composed of two supplementing halves of the object to be photographed, and means to deviate, in coordination with the focusing movement of the camera lens, the beam of the other part image system in order to bring these supplementing parts of the finder image into register for range finding purposes, one beam being deviated in a substantially vertical and the other in a substantially horizontal plane, the center line of the camera lens arranged substantially at the line of intersection of these two planes.

23. A camera according to claim 22, the front wall of said camera housing having two apertures for the two light beams of the two respective part image systems, the camera lens being arranged vertically below one of said apertures and at the same horizontal level as the other of said apertures.

ALFRED SIMMON.